UNITED STATES PATENT OFFICE.

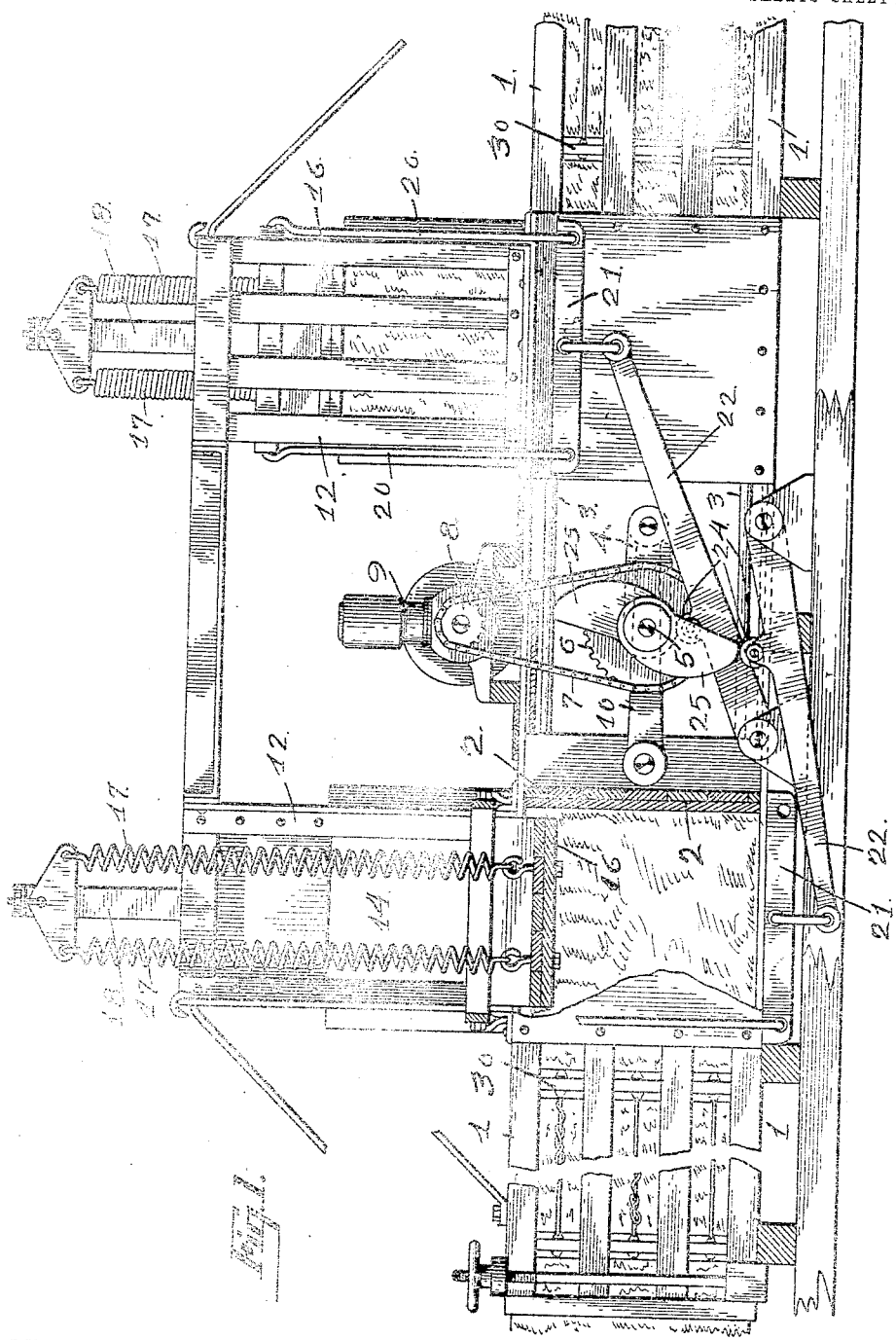

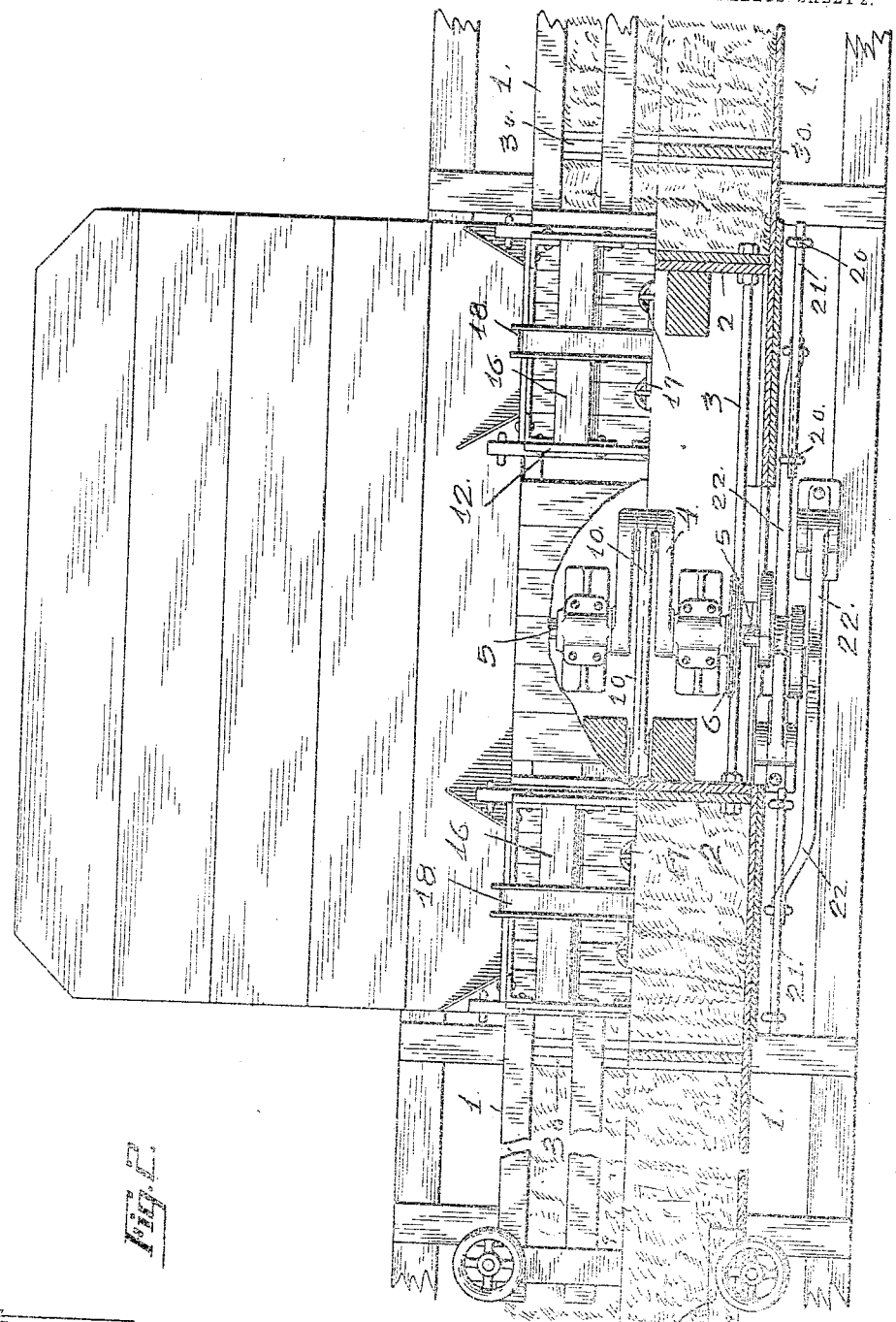

FREDERICK V. HAGAN, OF FITTING, NEVADA.

HAY-BALER.

1,123,521. Specification of Letters Patent. Patented Jan. 5, 1915.

Application filed May 7, 1914. Serial No. 837,585.

*To all whom it may concern:*

Be it known that I, FREDERICK V. HAGAN, a citizen of the United States, residing at Fitting, in the county of Humboldt and State of Nevada, have invented a new and useful Improvement in Hay-Balers, of which the following is a specification.

My invention relates to hay balers wherein vertically reciprocating plungers operate alternately in conjunction with horizontally reciprocating plungers; and the objects of my invention are, first, to provide improved means for partially compressing the hay to be baled into the baling chute before it is completely compressed into the said chute; and second, to provide an improved double ended baler, wherein the compressing or baling plungers work alternately so that hay may be partially compressed into one baling chute while the other baling plunger is finally compressing the hay in the other chute operated from the same mechanism; and third, to provide improved means whereby hay may be partially compressed in one hopper while a portion of hay is being put into the other hopper. I accomplish these several features by means of the device disclosed in the drawings forming a part of the present specification wherein like characters of reference are used to designate similar parts throughout the said specifications and drawings, and in which—

Figure 1 is a broken elevation of the device disclosing one of the vertical plungers partially pressing the hay from the hopper into the compression end of the baling chute. The drive shaft and motor for driving the same, and the manner in which the levers are engaged by cams on the drive shaft for the purpose of lowering the vertically reciprocating plunger and the manner in which one of the horizontally disposed plungers is connected to the crank of the drive shaft. Fig. 2 is a broken plan view partially in section disclosing the loading platform from which the hay is placed into the hoppers, showing one of the plungers in the compression end of the baling chute finally compressing the hay in the chute against one of the baling heads and the plunger, in the compression end of the other baling chute about to finally compress the hay in that chute.

Referring to the drawings, the numeral 1 is used to designate a baling chute composed of longitudinal slats. Slidably mounted within each baling chute 1 are the horizontally reciprocating plungers 2 connected together by suitable rods 3. A crank 4 on the drive shaft 5, which may be driven by means of a sprocket 6, chain 7 and a sprocket 8 on a suitable motor 9, has one end of the connecting rod 10 secured thereto, the other end of the said connecting rod 10 being secured to one of the plungers 2. For purposes of description, I shall hereinafter refer to that end of each of the chutes 1 wherein the plungers 2 are slidably mounted as the compression end of the baling chute.

Above each of the compression chutes 2 is a hopper 12 composed of vertically disposed slats and having an opening 14 in one side thereof. Vertically reciprocating plungers 16 are slidably mounted within the hoppers 12 and each plunger 16 is normally retained in its upper position by means of the springs 17 secured to a suitable standard 18, which is in turn secured above each hopper 12. Each plunger 16 is provided with four vertically disposed depending rods 20, the lower ends of which are secured to suitable yokes 21 which are in turn loosely secured to ends of the levers 22. The levers 22 are provided with rollers 24 which are adapted to be engaged by cams 25 on the drive shaft 5. The cams 25 operating one set of levers 22 for one hopper are arranged diametrically opposite the other cams 25 for operating the other set of levers 22 secured to the plunger in the other hopper.

While the hay in the compression end of one chute is being partially compressed into the said compression chamber, the other plunger 16 will be retained by the springs 17 in its upper position so that the hay to be compressed may be inserted within that hopper 12 while the inger 16 in the other hopper 12 is partially compressing hay in the compression end of the chute 1, as disclosed in Fig. 1 of the drawings.

The plungers 2 being connected together by means of the rods 3, it is obvious that while one plunger 2 is finally compressing the hay against the baling head 30, the opposite plunger will be withdrawn from the compression end of the opposite baling chute and the plunger 16 in the hopper 12 above the last mentioned chute will be partially compressing the hay in the said compression chamber. Briefly, the baling chute being in alinement, with the double plungers 2, reciprocating therein, while the hay is being finally compressed into one compression end of one chute by the horizontally reciprocating plunger 2, the hay will be partially compressed in the compression end of the other chute by means of the plunger 16.

It is obvious from the foregoing that I have provided a double ended hay baler wherein the hay may be partially compressed into the baling chute while hay is being inserted or placed in the hopper above the other compression chamber.

Having thus described my invention what I claim as new and desire to secure by Letters Patent is—

1. In a hay baler the combination of horizontally disposed baling chutes in alinement; horizontally reciprocating plungers slidably mounted within each chute; means for operating the plungers alternately; a hopper above the compression end of each chute; a plunger slidably mounted in each hopper and adapted to partially compress hay in the compression end of each chute; and means for operating the plungers in the hoppers alternately.

2. In a hay baler, the combination of horizontally disposed baling chutes in alinement; horizontally reciprocating plungers slidably mounted in each chute and connected together; a hopper above the compression end of each chute; a vertically reciprocating plunger slidably mounted in each hopper; means for normally retaining each vertically reciprocating plunger in its upper position; and means for operating the vertically and horizontally reciprocating plungers.

3. In a hay baler, the combination of horizontally disposed baling chutes in alinement; horizontally reciprocating plungers slidably mounted within each chute and connected together; a hopper secured above the compression end of each chute; a vertically reciprocating plunger slidably mounted within each hopper; a drive shaft rotatably mounted between the horizontal chutes; means secured to the drive shaft and adapted to partially lower one vertically reciprocating plunger and to raise the other vertically reciprocating plunger simultaneously; means operatively connected to the drive shaft and arranged to reciprocate the horizontally reciprocating plungers; and means for normally retaining each vertically reciprocating plunger in its upper position.

4. In a hay baler, the combination of horizontally disposed baling chutes in alinement; horizontally reciprocating plungers slidably mounted within each chute and connected together; a hopper secured above the compression end of each chute; a vertically reciprocating plunger slidably mounted within each hopper; a drive shaft rotatably mounted between the horizontal chutes; a crank secured to the drive shaft; a connecting rod between one of the plungers and the crank; cams secured to the drive shaft; and means operatively connecting the cams and the vertically reciprocating plungers and adapted to lower one of the said plungers and partially compress hay from one of the hoppers into the chute while the hay in the other chute is being finally compressed; and means for normally retaining each vertically reciprocating plunger in its upper position.

5. In a hay baler, the combination of horizontally disposed baling chutes in alinement; horizontally reciprocating plungers slidably mounted within each chute and connected together; a hopper secured above the compression end of each chute; a vertically reciprocating plunger slidably mounted within each hopper; a drive shaft rotatably mounted between the horizontal chutes; a crank secured to the drive shaft; a connecting rod between the crank and one of the plungers; cams secured to the drive shaft; levers connected to the vertically reciprocating plungers and adapted to be engaged by the cams for the purpose of lowering one plunger in one hopper and partially compressing hay from the said hopper into the compression end of one chute while the plunger in the other chute is finally compressing the hay in the other chute; and suitable springs secured to each vertically reciprocating plunger and adapted to normally retain the said plunger in its upper position.

In witness whereof I hereunto set my signature in the presence of two subscribing witnesses.

FREDERICK V. HAGAN.

Witnesses:
BERNICE MOORE,
JAMES F. McCUE.